Feb. 7, 1939.  M. A. SCHAFER  2,146,271
ANTITHEFT SIGNAL DEVICE
Filed March 22, 1935
Fig. 1
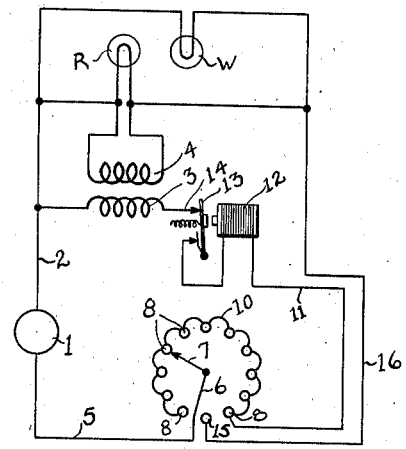
Fig. 2
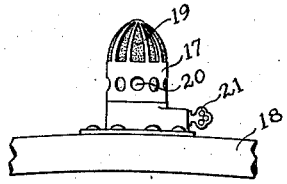
Fig. 4
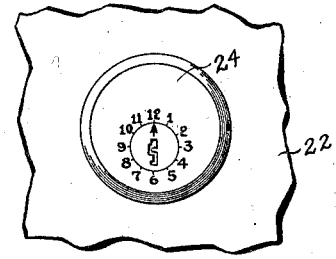
Fig. 3
Fig. 5
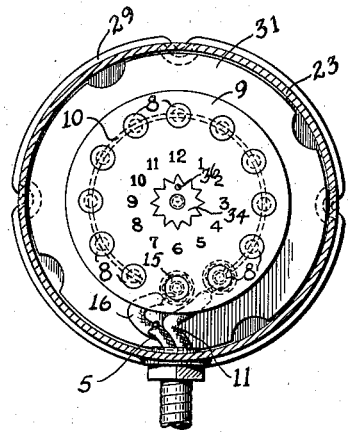
INVENTOR
BY  Marcus A. Schafer
Darby & Darby
ATTORNEYS Patented Feb. 7, 1939

2,146,271

UNITED STATES PATENT OFFICE 2,146,271

ANTITHEFT SIGNAL DEVICE

Marcus A. Schafer, Stapleton, N. Y., assignor to Maud Coury, Brooklyn, N. Y.

Application March 22, 1935, Serial No. 12,343

5 Claims. (Cl. 177—314)

This invention relates to an anti-theft signal device which may be used on an automobile to notify observers that the automobile is being used without the authority of the owner.

The invention involves the use of two signal lights, one of which may be white to indicate that the automobile is in the possession of an authorized user, and the other of which may be red to give a warning signal. Provision is made in accordance with this invention to burn out the white light in the event the red light shall be illuminated, so that once the red light indicating unauthorized use of the car has been illuminated, it will be impossible for the thief thereafter to manipulate the signal apparatus to give a "clear" signal. Provision is further made whereby the clear signal may be given only at a single point on a dial, which point will, of course, be known to the authorized user of the car while the red light will be lighted when the dial is manipulated to any other setting.

A feature of this invention is the provision of means for burning out a clear light at the time the unauthorized use of an automobile begins.

Another feature of the invention is the provision of simple and convenient means for changing the setting of the dial with respect to the position at which a clear signal is given.

In the drawing,

Figure 1 is a circuit diagram showing the electrical circuits and connections of my invention;

Figure 2 is a partial view of the top of an automobile showing an anti-theft signal light secured to the roof of the car in accordance with my invention;

Figure 3 is a view partly in section through the portion of the device of my invention which will be attached to the dashboard of a car and will have a dial on the front thereof;

Figure 4 is a front view of the dial of the device mounted on the dashboard of the car; and Figure 5 is a section along the line 5—5 of Figure 3.

In the drawing, similar reference numerals refer to similar parts throughout.

The electrical circuits of my invention are operated from the usual generator 1 of the ordinary ignition system of the car, which, in accordance with usual practice, generates a current of electricity at 6 volts. The generator is connected on one side by lead 2 to the primary 3 of a step-up transformer, in the secondary 4 of which the current will be stepped up to 110 volts through the operation of the apparatus to be described. The other side of the generator 1 is connected through a lead 5 to a brush 6 which makes contact with an arm 7 which wipes the contacts 8 on a contact disc 9. The contacts 8 are all connected by an electrical conductor 10 so that the circuit is the same when contact is made to any one of them. From the contacts 8 a conductor 11 goes to a relay 12 and then to the armature 13 of said relay. The armature 13 makes contact with contact 14 which is connected to the opposite side of primary 3 from that side to which the generator is connected by conductor 2. The actual number of turns for both the primary and secondary windings of the above step-up transformer need not be stated since the ratio of the number of turns in the respective windings is in direct proportion to the voltage ratio of the two windings.

It will be seen that this circuit is completed by turning the arm 7 to make contact with any of the contact points 8. On completion of the circuit through a contact 8 the armature 13 will be set in vibration in the same manner as the usual armature of a doorbell, and intermittent pulses of current will flow through the primary 3. These pulses are stepped up in the secondary 4 to 110 volts, and across the secondary 4 are connected in parallel a red light R and a white light W. In addition to the contacts 8 on disc 9 there is an additional contact 15 which is not connected to the contacts 8 or to lead 11 but is insulated therefrom. Contact 15 is connected to a conductor 16 which completes a circuit through the white light W and back through conductor 2 to generator 1 whenever arm 7 makes contact with contact 15.

The red and white lights referred to are mounted in a steel compartment 17 on the roof 18 of the automobile and may be so mounted that the red light may be seen through openings 19 in the top of the compartment and the white light through openings 20 in the sides of the compartments. Of course, any other desired arrangement of the lights may be made. A suitable lock is provided, to prevent access to the compartment by unauthorized persons, which may be operated by a key 21. Securely attached to the dashboard 22 of the automobile, as by welding or in any other suitable manner, is a casing 23. A dial 24 is mounted on the dashboard in the center of said casing and a suitable lock operated by a key 25 is secured to said dial by lock nut 26. The barrel 27 of said lock turns with the key 25. The arm 7 is secured to the barrel 27 by suitable securing means, such as screw-headed bolt 28. The casing 23 has a rear cover 29 to which is secured a lock which is operated by a key 30. The barrel of this lock turns a locking disc 31 to lock the cover 29 to the casing 23. Secured to the barrel 32 by any suitable means, such as a screw-headed bolt 33, is a star-shaped member 34 whose projections fit into similar depressions at the center of disc 9. A washer 35 is held between the bolt 33 and member 34 to retain the disc 9 firmly in position. A pin 36 projecting from member 34 extends inwardly in a hole through the barrel 32 to prevent any relative motion between the member 34 and barrel 32. This consequently prevents any relative motion of the disc 9 with respect to the barrel 32 so that when the key 30 is turned a fixed amount to lock the cover 29 to the casing 23 the disc 9 is turned the right amount to bring the contact 15 thereon at the proper place with relation to the dial 24 so the owner of the car will know to what point on the dial to turn key 25 in order to light the white light.

The electrical conductors to the various portions of the device may, of course, be enclosed in a steel cable, as indicated in Figures 3 and 5, or in any other suitable manner to protect it from tampering. The disc 9 may, of course, be made any desired size and have as many contacts thereon as desired, and accordingly the number of positions indicated for the dial 24 may be increased correspondingly. The locks which are operated by keys 21, 25 and 30 may all be similar so that a similar key may operate all three of them, or two of them may be similar, or they may all be different, as desired.

The operation of my device is as follows:

The owner of the car may open the rear cover 29 by inserting his key 30 therein and turning the key until the locking disc 31 is released. The leads 11 and 16 within the casing 23 will be of sufficient length to permit the rear portion of the device to be brought down below the edge of the dashboard so that it may be adjusted. The owner will then remove bolt 33 and washer 35. He may then lift contact disc 9 away from engagement with member 34 and turn it for any setting he desires to make. Let us assume that he turns it so that contact 15 of disc 9 corresponds to dial position 6 on dial 24. He then replaces the washer 35 and bolt 33, places the cover 29 back on casing 23 and turns the key 30 a fixed amount to lock the cover in position. He then removes key 30 to prevent access to the compartment by anyone else. He, of course, also removes key 21 to prevent access to the light compartment. Before the owner starts the engine of his automobile he will turn his key 25 to the position 6 on dial 24 in order to make contact between arm 7 and contact 15 on disc 9. When he parks his car he will turn the engine off, which will discontinue the operation of generator 1, and then to remove his key 25 he must turn it to position 12 on dial 24. This will leave arm 7 on some contact other than contact 15. In the event the thief then starts the car and drives it away the generator 1 will begin to operate to supply current at 6 volts. This current will flow through arm 7 to one of the contacts 8 and complete the circuit through armature 13 and the primary 3 of the transformer back to generator 1. Current at 110 volts will accordingly be induced in the secondary 4 of the transformer and supplied to the white and red lights. As the white light is designed to operate on 6 volt current, it will immediately burn out. The red light, however, which is designed to operate on 110 volt current will be lighted so that this will be a definite signal to anyone who sees the car in operation that it is being used by an unauthorized person.

Let us assume, however, that the thief has a key 25 with which to operate the anti-theft device. When he gets in the car he inserts the key in the lock and may leave it at that position or turn it to any position he desires. There will be only one position to which he can turn it, however, namely position 6 corresponding to contact 15, which will complete the circuit through the 6 volt white light to give the clear indication. At any other position on the dial the circuit will be completed through one of contacts 8 to light the red light, giving a warning signal, and burning out the white light. The white light being burned out, if the thief then tries to adjust the dial in order to turn off the red light and turn on the white light he will be successful in turning the red light off but will not be able to turn the white light on, and the absence of this white light will still constitute a signal that the car has been stolen.

It will be noted that the circuit through the contact 15 to the white light also completes a circuit through the red light. Since the red light is designed for operation on 110 volts, the filament of this light will not be heated to visibility, or will be heated to such a dim degree of visibility that the white light, which is designed to operate on 6 volts, will outshine it. After the 6 volt white light has burned out, however, if the dial is turned to complete the circuit through contact 15 this will again complete the circuit through the red light, which has not burned out, and this dim red light may then be visible as a warning signal.

It will be understood that various modifications may be made in this invention without departing from the scope thereof. For example, the cover 29 may be an integral part of casing 23 and the adjustment of contacts made at the factory before the device is shipped. In this event, of course, no lock would be provided for the cover 29 and access could not be had thereto except with considerable labor and with proper tools. The number of contacts 8 may, of course, be increased indefinitely, providing an additional safety factor, as there will be more points which will give a warning signal and consequently less chance for the thief to turn the dial to the proper position to give a clear signal, provided he is able to turn the dial at all.

After a car has been retrieved by the owner, he, of course, may insert key 21 in the compartment 17, unscrew the burned out white bulb and insert a new one in its place. He may then again lock the compartment 17 and his device will again be prepared to give a warning signal against the next unauthorized user.

If desired, the circuit to the white light may include a switch to permit the owner to break this circuit to test the red light without burning out the white light. This switch may take the form of a contact arm operated by key 21, similar to contact arm 7 which is operated by key 25, and a contact disc similar to disc 9. In this case there would preferably be only a single point on this contact disc at which the circuit to the white light would be open, as a precaution against a similar test by an unauthorized person who might have a suitable key.

What is claimed is:

1. An anti-theft signal device for automobiles comprising in combination with the generator of an automobile a clear light and a warning light both mounted in position to be seen from the outside, a disc having a plurality of contacts thereon, a contact arm cooperating with said disc contacts for completing connections from the generator to said lights, and means whereby when said contact arm is moved to a predetermined contact it cooperates therewith to supply a 6 volt current from said generator through said clear light and when moved to any other contact supplies 110 volt current to both said lights.

2. An anti-theft signal device for automobiles comprising, in combination with the generator of an automobile, a clear light and a warning light both mounted in position to be seen from the outside, a disc having a contact for completing a circuit from the generator through said lights, a vibrating relay, a transformer in series with said relay, a plurality of connected contacts on said disc for completing the circuit through said relay and the primary of said transformer, and connections from the secondary of said transformer through said lights in parallel.

3. An anti-theft signal device for an automobile having a generator, said device comprising a clear light and a warning light both mounted in an enclosure having openings through which said lights are visible from the outside, a vibratory relay and a transformer in series therewith, a contact disc having a terminal connectable through a circuit to the generator and said lights, said disc having an additional plurality of contacts connectable through a circuit to said relay and transformer to light said warning light, and a contact arm for cooperating with said disc to select either of said circuits.

4. An anti-theft signal device for automobiles comprising a clear light and a warning light both mounted in an enclosure having openings through which said lights are visible from the outside, a disc with a plurality of contactable circuit terminals, a circuit comprising a generator and a transformer connected to said disc terminals and said lights, a contact arm cooperating with said disc, and means for operating said arm to complete a connection through said clear light through a particular contact on said disc and cooperating with any other contact on the disc to impress upon said clear light a high voltage from said transformer to burn out this light and to light said warning light.

5. An anti-theft signal device for automobiles comprising a locked compartment mounted in a conspicuous position on said automobile, a pair of signal lights in said compartment visible from the outside thereof, a second locked compartment enclosing a contact disc and a contact arm cooperating with said disc, a dial mounted on the dashboard of said automobile and adjustably connected with said contact arm, electric circuit connections comprising a transformer with means for either selective energization of one signal light or simultaneous energization of said lights adapted to be made by operation of said dial and means for operating said dial selectively to complete a circuit through said contact arm and disc to said signal lights.

MARCUS A. SCHAFER.